Oct. 25, 1966   W. B. WILKINS   3,281,306
ACTUATED MOLD AND EJECTOR
Filed June 4, 1963   3 Sheets-Sheet 1
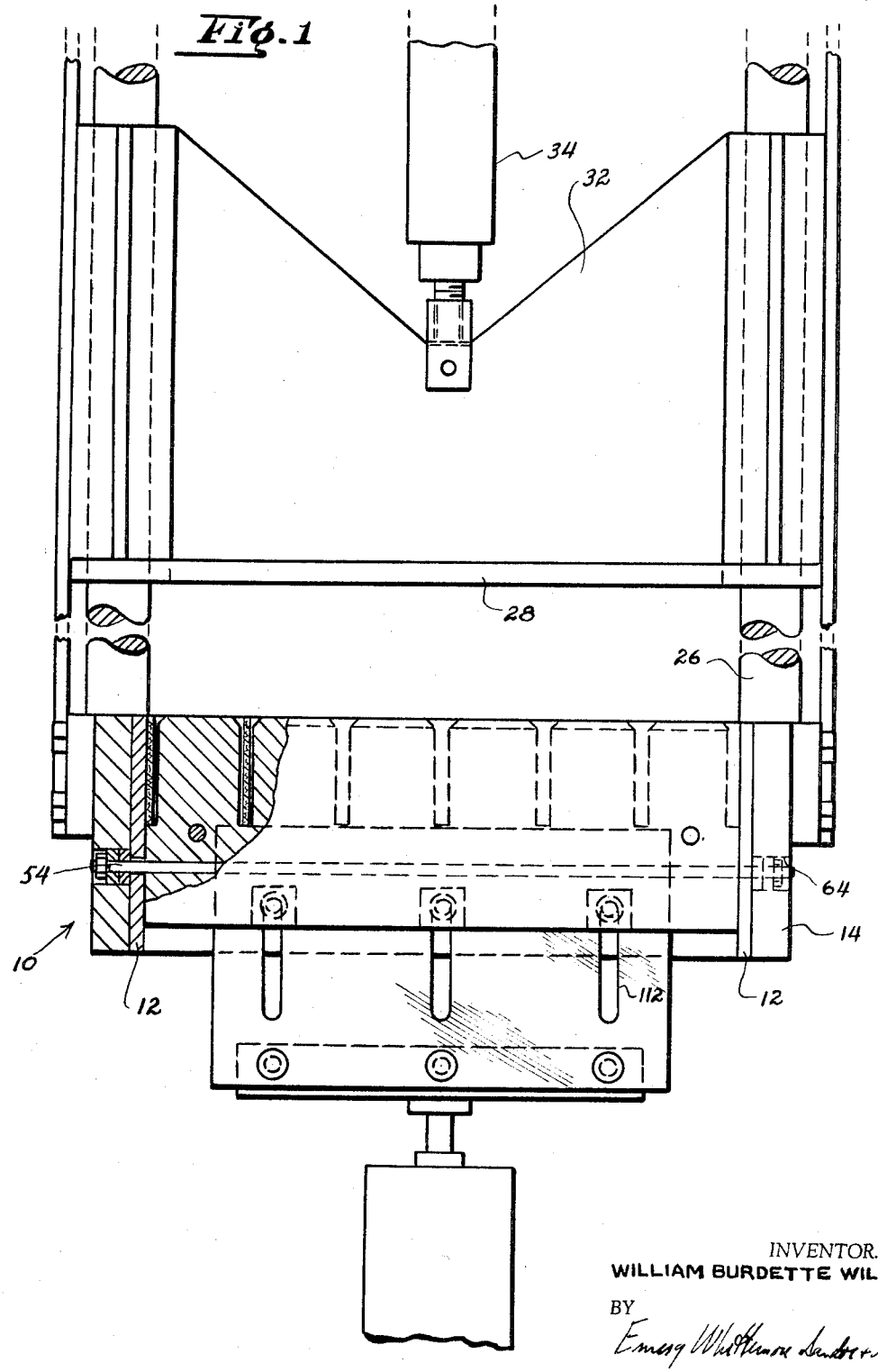
INVENTOR.
WILLIAM BURDETTE WILKINS
BY
ATTORNEYS

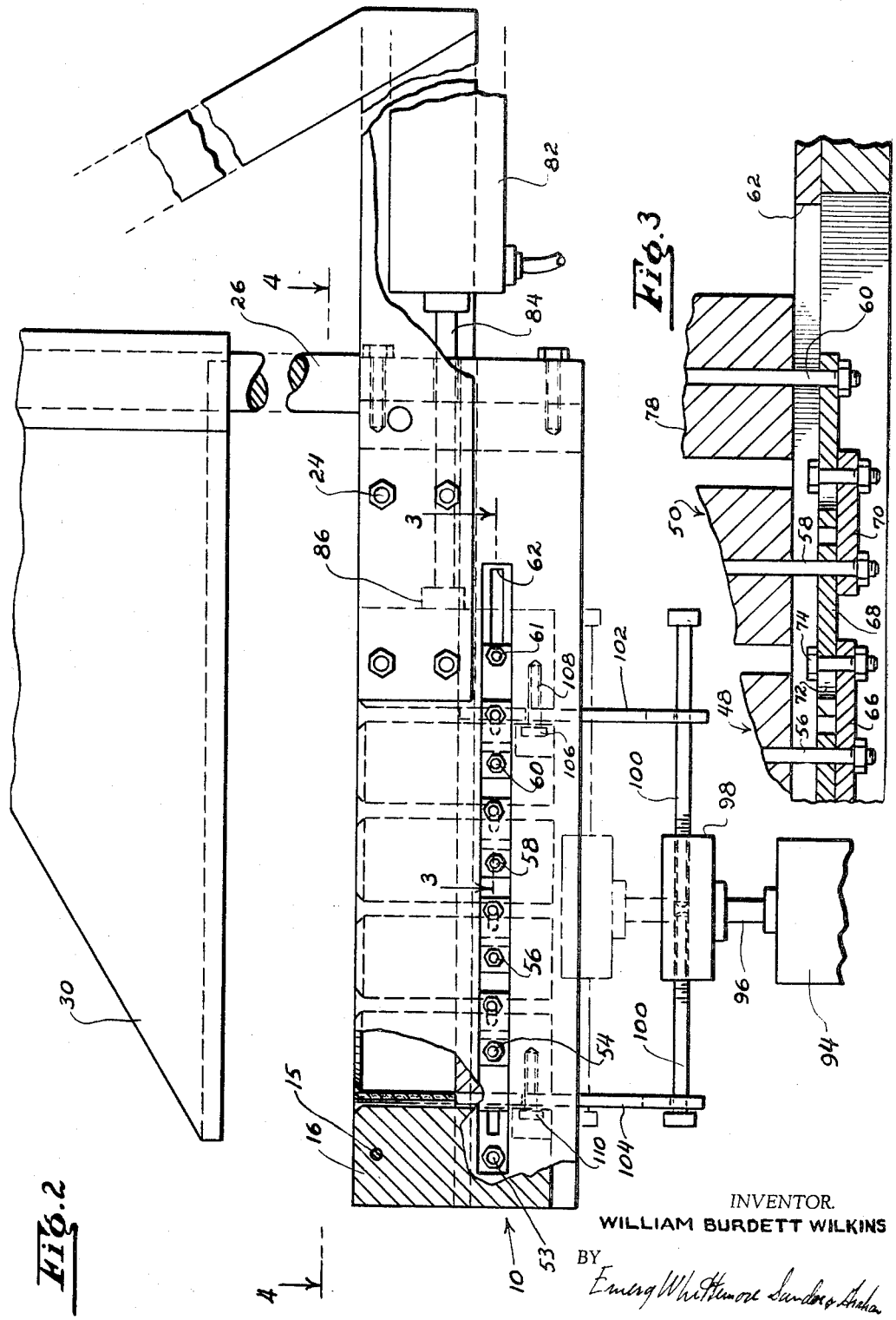

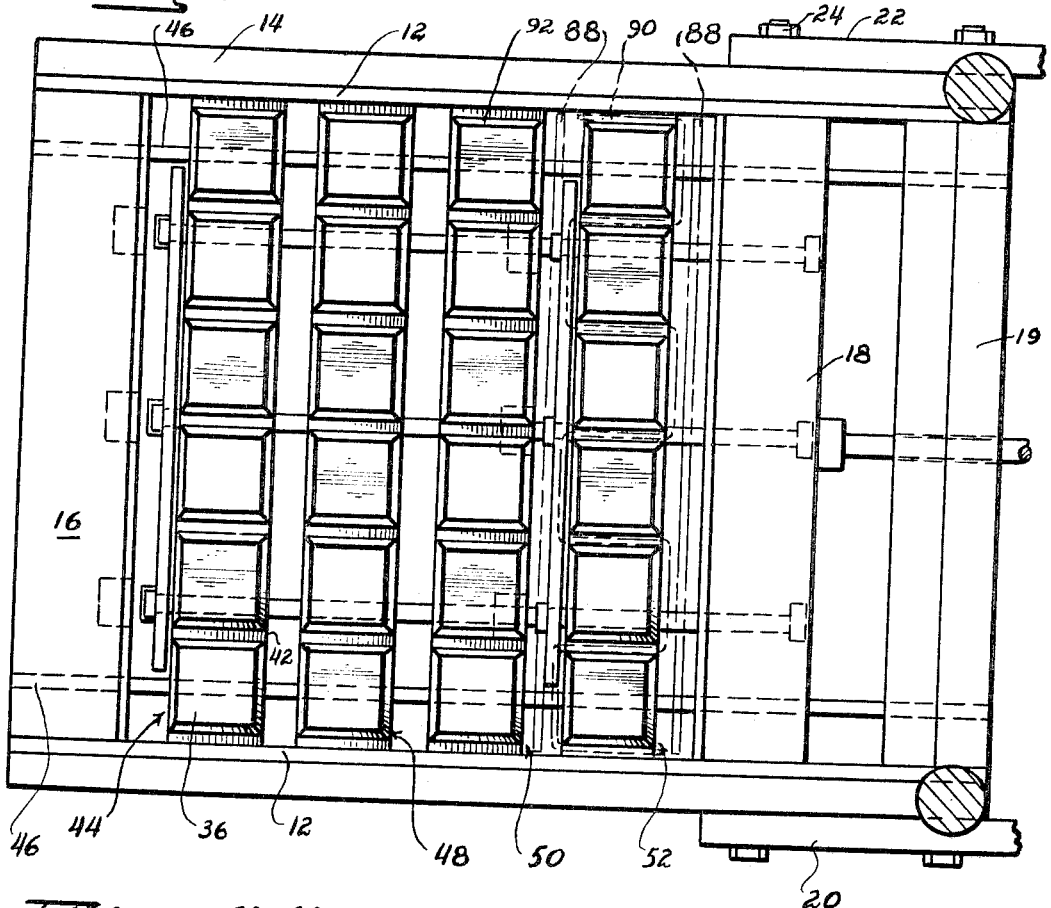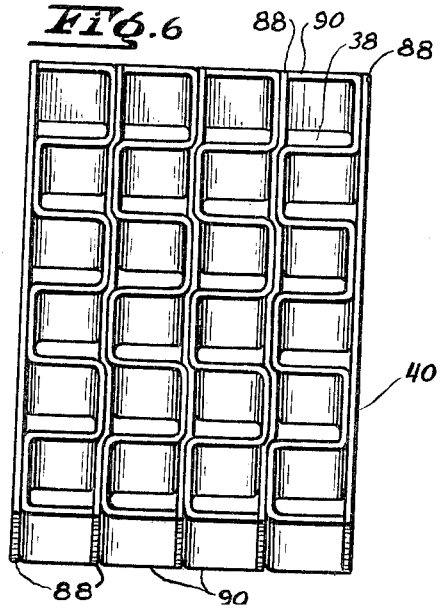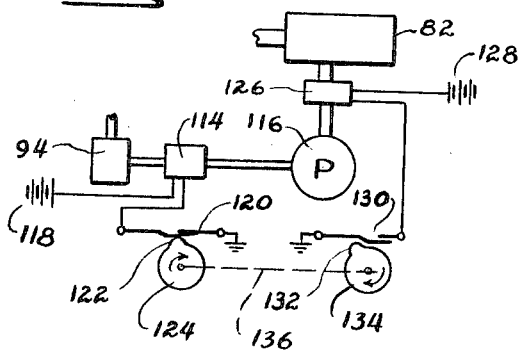

United States Patent Office 3,281,306
Patented Oct. 25, 1966

3,281,306
ACTUATED MOLD AND EJECTOR
William Burdette Wilkins, Roxboro, N.C., assignor to Reinforced Plastic Container Corporation, Roxboro, N.C.
Filed June 4, 1963, Ser. No. 285,374
9 Claims. (Cl. 156—469)

This invention relates to molds and, more particularly, relates to an actuated mold in which mold segments are closed upon the structure molded therein and to an ejector for ejection of the formed structure from the mold.

In order to form many types of structures such as nests for crates and the like, it is convenient to use a mold having a plurality of mold segments which can be separated in an open position. The material, such as strips of cardboard and the like, can then be loaded into the mold. Closure of the mold will press the material together into the desired orientation and under sufficient pressure to bond together the strips of material while held in the desired positions. The mold may be heated so as to enable use of thermosetting bonding resins in which case the bonding is effected by curing of the resin applied to the various structural materials forming the nest. In such cases, the mold must be closed with sufficient pressure, so that the heat and pressure is sufficient to flow the resin into the surface interstices of the material and to cure the resin while so held, thereby to provide proper bonding.

With many structures, however, the configuration of the structure is such as to enclose the mold segments when the mold is closed. Thus, after curing of the resins and bonding together of the component parts of the structure, the mold cannot be opened without tearing apart the assembled structure into its component pieces.

For this reason, the art has provided relatively sophisticated mold assemblies in which, for example, the mold segments can be individually collapsed for removal of the nest and the like. Alternatively, the art has resorted to special designs of such nests to allow molding of the nest by split dies in which the alternate die segments are inserted from respective alternate sides of the nest for molding. By special design of the nest, draft can be provided for each segment, allowing removal of the mold segments after curing.

Such solutions have not offered the desired economies of molding. For example, collapsible segments are extremely expensive and applications justifying such expense are rarely encountered. The use of split dies is expensive and requires adaptation of the design of the end product to molding practice. In addition, such dies are difficult to load in economical fashion.

It is, therefore, an object of the present invention to provide an actuated mold in which a plurality of mold segments are closed upon sheet material loaded therein to bond together selected portions of such material into a nest structure enclosing the mold segments and in which an ejector is provided for ejection of the structure in simple fashion, without destruction of the structure, and in manner permitting economical high production rates.

In accordance with this object, there is provided, in a preferred embodiment of this invention, a mold for a container nest which consists of a plurality of mold segments, each of which is proportioned for the inside dimensions of each compartment desired in the assembled nest.

The segments are fixedly positioned in rows. Each row is movably mounted within the mold frame and the rows are coupled together through lost motion couplings so that a single mold pneumatic ram driver can be coupled to one of the rows and on actuation of the driver will open the mold by separating each row from an adjacent row by the distance determined by the lost motion coupling. When the mold is opened, strips of material such as cardboard, laminated papers and the like may be easily loaded therein. To form the nest, divider strips are inserted between rows to form the transverse partitions of the nest. To form the longitudinal partitions, strips are woven in an out of adjacent segments in each row. A bonding resin is applied to the surfaces of the strips at the area to be joined together in the finished nest structure. The pneumatic ram is then actuated to clamp the strips together under positive pressure in the desired configuration.

The mold is heated and the mold closed under sufficient pressure and for a time period sufficient so that the combined heat and pressure between the mold segments will cure the resin and bond together the assembled strips of material into the desired nest configuration. After curing and while the positive mold pressure is applied to hold the structure in positive fashion, the ejector is actuated. The ejector comprises pusher plates adapted to fit between the rows and a pneumatic ejector ram to apply an upward ejection force to the ejector plates. The pneumatic pressure in the ejector ram is allowed to build up to full operating pressure urging the ejector plates against the corresponding partition walls. Since the mold is still closed by ram pressure, ejection of the nest is prevented. The closed mold segments also support the partition walls against collapse under ram pressure.

At a later closely controlled time, the air pressure is applied to the mold driver pneumatic ram to open the mold. It has been found that upon actuation of the pneumatic ram, the ram will hesitate, usually accompanied by slight vibration. During this hesitation, the assembled nest will be ejected from the mold due to the fact that pressure is previously built up in the ejector ram so that, as the mold is opened, even at the extremely high speeds of the ram drive, the molded structure will not be destroyed by ripping apart of the partitions encircling each segment. The opened mold is now ready for reloading.

Having briefly described this invention, it will described in greater detail along with accompanying objects and advantages thereof, in the following detailed description, which may best be understood by reference to the accompanying drawings, of which:

FIG. 1 is a partially sectioned elevation view of a mold constructed in accordance with the present invention;

FIG. 2 is a paritally sectioned side view of the mold shown in FIG. 1;

FIG. 3 is a section view taken along lines 3—3 of FIG. 2;

FIG. 4 is a section view taken along lines 4—4 of FIG. 2;

FIG. 5 is a schematic diagram illustrating the timing sequence of the mold actuating and ejector rams; and FIG. 6 is a perspective view of the nest formed by the mold shown in FIGS. 1–4.

In FIGS. 1–4, there is shown a mold 10 consisting of parallel side walls 12, supportedly coupled to frame members 14, a fixed mold pattern 16 which defines the end wall of the mold and which is joined to the ends of the side walls and framed by a thru-bolt 15, and a movable platen 18 which defines the other end wall of the mold. The rigid supporting framework is completed by transverse beam 19 at the other end of frame members 14 from platen 16. The mold is carried within a frame comprising members 20 and 22 to which the frame members 14 are coupled by bolts 24.

Vertical standards 26 are provided on the frame. A leveling platen 28 carried by support members 30 and 32 is slidably mounted on the standards 26 and is moved vertically by pneumatic ram 34. The platen is used to provide positive positioning of materials assembled in the mold.

The mold itself comprises a plurality of segments 36, each of which is of square cross sectional shape and is dimensioned according to the desired interior dimensions of the compartments 38 of the desired nest 40 shown in FIG. 6.

Mold segments are assembled into rows by forming segments 36 on a transversely extending support 42. For example, each row may be machined from a continuous piece of stock.

Thus, row 44 is composed of a plurality of mold segments. The row 44 is slidably mounted within the frame upon the longitudinally extending guide rods 46. The other rows of segments 48, 50 and 52 are constructed and mounted in similar fashion.

The rows are coupled together by lost motion linkages, to allow opening of the mold coupled with separation of each row by a single driver. For this purpose, tie rods 53, 54, 56, 58, 60 and 61 respectively extend through stationary platen 16, rows 44, 48, 50, 52 and movable platen 18. Each tie rod is coupled to the adjacent tie rod by a lost motion coupling. For example, the tie rod 56 is fixedly coupled to follower 66. Similarly, tie rod 58 is coupled to a traveller 68 having an axially extending slot 72 therein. Follower 66 is coupled to traveler 68 by clevis bolt 74 extending through slot 72. In this manner, a lost motion coupling is provided so that as row 50 is moved, the traveller 68 will slide over follower 66 permitting relative motion between the row 50 and row 48 as the bolt 74 slides within slot 72. When a bolt 74 reaches the end of slot 72, the traveller 68 will pick up follower 66, coupling row 48 to row 50 and both rows will move.

The remaining rows and the moving and stationary platens are similarly coupled together so that the mold may be opened by a single driver coupled to movable platen 18 and, when opened, the rows will be separated one from the other by a predetermined amount to facilitate loading of the mold. The linkages preferably travel in tracks 64 in frame members 14. A pneumatic ram 82 is provided, the operating plunger 84 of which is coupled to the movable platen by threaded engagement of nut 86 therewith. The pneumatic ram serves as the mold drive to close the mold under positive pneumatic pressure and to open the mold quickly by movement of platen 18, which movement is transmitted to the rows of mold segments by the lost motion linkages.

When opened, the mold may be loaded by weaving a strip 90 of material along the rows between adjacent segments to form the partitions. The partition strip may be formed by cardboard, laminted paper or other fiber sheet material. To assist in insertion of the strip 90, the tops of the molds may be bevelled as at 92. Dividers 88 of the same material as the partitions are then inserted between rows. A bonding agent, such as a thermosetting urea resin, is applied to the surfaces of the divider 88 and partition member 90 over the areas to be bonded together by the mold in the formation of the nest.

When the mold is loaded, the ram 34 is actuated to bring down platen 28 to level all of the inserted material and to ensure insertion to the same depth. The partition strips are prevented from falling through by the support 42; the dividers by rods 46.

The mold is then closed by actuation of pneumatic ram 82 as shown in FIG. 2 to clamp together the dividers 88 and separator 90. The molds are heated by conventional means as, for example, by an electric heating element in each of the mold segments. The heat and mold pressure causes the applied resin to flow into the interstices of the surface of the material and to cure thereby to set the resin bonds and to form the nest shown in FIG. 6.

Since the nest is formed in the closed mold, it is apparent that any attempt to open the mold will rip apart the assembled nest. To remove the nest without destruction, an ejector is provided. The ejector consists of a pneumatic ejector ram 94, the actuated piston rod 96 of which is coupled to frame assembly 98. Traveller rods 100 are mounted in the frame 98 and extend outwardly from both sides thereof. Ejector plates 102 and 104 are dimensioned so as to fit between adjacent nests when the mold is closed being preferably of substantially the same thickness as divider 88 and 90 together. Plate 102 is carried by pins 106 engaged within the movable platen 18 by the threaded shank 108 thereof. Similarly, plate 104 is mounted on the segment row 44 by pins 110 engaged therein. The pins 106, 110 extend through slots 112 in the ejector plates 102, 104 respectively to maintain the positional alignment of the plates 102 and 104 with platen 18 and row 44 respectively as the mold is opened and closed, but permit the plates 102 and 104 to move upwardly between the rows of the mold.

In order to eject the molded structure without destruction, the pneumatic ram 94 is actuated by opening the electrically actuated valve 114 (FIG. 5) coupling ram 94 to the source of air pressure 116. Energizing of valve 114 may be made through a source 118 and normally open switch 120 closed by the lobe 122 on cam 124. Similarly, ram 82 is coupled by an electrically actuated valve 126 to pressure source 116, valve 126 being actuated by source 128 and switch 130 when the lobe 132 of cam 134 closes the normally open switch 130. Cams 124 and 134 are mechanically coupled by shaft 136 for conjoint rotation in the directions indicated and are conveniently driven by a timing or clock motor.

Thus, when the mold is still closed, air pressure is applied to the cylinder 94 to move plates 102 and 104 upwardly into engagement with the nest encased in the mold. The pressure applied by the segment rows of the mold on the nest prevents movement of the nest and air pressure is built up in the ejector ram to the full operating pressure. The pressure of the adjacent rows on the nest material in contact with plates 102, 104 prevents buckling along the contact lines. As lobe 132 closes switch 130, at a subsequent time, for example, one second later, the ram 84 is supplied with air pressure to forcibly and quickly open the mold. However, as is known when air pressure is suddenly applied to the ram, momentary hesitation and slight oscillation of the piston occurs. During this momentary hesitation and oscillation, ram 94 can operate to eject the structure without destruction as the mold pressure is relieved. The lost motion coupling between the moving platen 18 and the row 52 also aids in providing a very short interval between relieving full molding pressure and movement of row 52. This time, though short, is used for the operation of nest ejection before mold movement destroys the nest. Thus, the structure shown in FIG. 6 is popped out of the mold before the opening mold can separate and destroy the structure.

Thus, in surprisingly simple fashion, there is provided a mold and ejector which is capable of molding structures such as nests formed from components which are assembled in the mold and, when formed completely encircle the mold segments. The segments are straight sided segments so that the formed nest is formed with regular compartments 38 of constant cross sectional dimension. Also, it is unnecessary to distort the nest for the purposes of providing means for entry of split molds carrying alternate segments as necessary with prior art arrangements. Furthermore, since the mold can be loaded and cycled rapidly, relatively high production rates can be achieved.

This invention may be variously modified and embodied within the scope of the subjoined claims.

What is claimed is:

1. In combination, a mold, said mold having mold segments to receive strips of material having a bonding resin applied to portions of the surfaces of adjacent strips for bonding together all of said strips in a composite structure, in which said strips of material are formed into shapes completely encircling the periphery of each of said mold segments, a double acting pneumatic ram to close said mold by moving said segments together to clamp said adjacent strips together, and to open said mold by separating said segments, an ejector pneumatic ram, an ejector coupled to said ejector ram, said ejector being dimensioned to fit between adjacent segments when said mold is closed, a source of pneumatic pressure, means for applying said pneumatic pressure to said ejector ram when said mold is closed, and means for applying said pneumatic pressure to said mold ram to open said mold at a subsequent time whereby said ejector will eject said composite structure before said mold segments are moved sufficiently far to destroy said structure.

2. The combination in accordance with claim 1 which includes a first electrically operated valve to couple said ejector ram to said source, a second electrically operated valve to couple said mold ram to said source and switch means to energize said first valve and then to energize said second valve at a later time.

3. The combination in accordance with claim 1 in which said mold segments are arranged in rows and which includes a transversely extending support for each row on which are mounted the segments of said row, and means for moving said rows together under pressure for bonding of said strips of material.

4. The combination in accordance with claim 3 in which the first of said rows of segments is fixedly mounted and in which said mold pneumatic ram is coupled to the last of said rows to move said last row towards said first row, clamping intermediate rows therebetween.

5. The combination in accordance with claim 4 in which said rows are coupled together through a lost motion linkage to separate each row from an adjacent row by the distance predetermined by such linkage as said last row is moved away from said first row.

6. The combination in accordance with claim 1 which includes a leveling platen mounted above said mold and parallel therewith and means to move said leveling platen into engagement with said mold to level said materials inserted therein.

7. In combination:
   a mold to form a nest from divider strips and partition strips;
   said mold comprising
   a first and second side wall disposed in parallel relationship;
   a stationary platen positioned between and coupled to one end of the side walls;
   guide rods extending parallel to said side walls;
   a movable platen slidably mounted on said guide rods;
   a plurality of rows of mold segments slidably mounted on said guide rods between said fixed and movable platens;
   each of said rows of segments being adapted to receive a partition strip woven around adjacent segments;
   a mold ram coupled to said movable platen to move said movable platen towards said fixed platen to close said mold urging said partition strips into encircling engagement with each of said segments and into bonding engagement with divider strips placed between rows and away from said fixed platen to open said mold;
   an ejector;
   said ejector comprising
   ejector plates dimensioned to slide between adjacent rows of said mold when said mold is closed;
   an ejector ram coupled to said ejector plates and adapted to drive said ejector plates upwardly between said rows when actuated;
   means for energizing said mold ram to close said mold;
   means for energizing said ejector ram when said mold is closed to urge said ejector plates against said nest;
   means operable subsequent to said last named means for energizing said mold ram to open said mold.

8. A combination in accordance with claim 7 in which said segments are coupled together in said rows by a plate, which includes a platen movable into engagement with the top of said mold segments, said platen, said plate, and said guide rod cooperating to position materials loaded into said mold.

9. A combination in accordance with claim 7 in which each of said ejector plates is slidably coupled to a respective row of segments to maintain alignment of the plates with the respective rows during opening and closing of the mold.

References Cited by the Examiner
UNITED STATES PATENTS 2,606,133 8/1952 Havens _____ 156—469
2,769,481 11/1956 Meanor et al. _____ 156—469

EARL M. BERGERT, *Primary Examiner.*

H. F. EPSTEIN, *Assistant Examiner.*